(12) United States Patent
Moore et al.

(10) Patent No.: US 11,269,364 B2
(45) Date of Patent: Mar. 8, 2022

(54) CONTROL MANAGEMENT SYSTEM HAVING PERPETUAL CALENDAR WITH EXCEPTIONS

(71) Applicant: Braeburn Systems LLC, Montgomery, IL (US)

(72) Inventors: Glenn A. Moore, Geneva, IL (US); Daniel S. Poplawski, Oswego, IL (US)

(73) Assignee: Braeburn Systems LLC, Montgomery, IL (US)

(*) Notice: Subject to any disclaimer, the term of this patent is extended or adjusted under 35 U.S.C. 154(b) by 0 days.

(21) Appl. No.: 15/708,995

(22) Filed: Sep. 19, 2017

(65) Prior Publication Data

US 2018/0081378 A1  Mar. 22, 2018

Related U.S. Application Data

(60) Provisional application No. 62/396,639, filed on Sep. 19, 2016.

(51) Int. Cl.
*G05B 15/02* (2006.01)
*G05D 23/19* (2006.01)
(Continued)

(52) U.S. Cl.
CPC .......... *G05D 23/1904* (2013.01); *F24F 11/30* (2018.01); *F24F 11/52* (2018.01);
(Continued)

(58) Field of Classification Search
CPC . G05D 23/1904; G05D 23/1917; F24F 11/52; F24F 11/61; F24F 11/65;
(Continued)

(56) References Cited

U.S. PATENT DOCUMENTS

| 2,054,039 A | 9/1936 | Persons |
| 2,060,636 A | 11/1936 | Persons |

(Continued)

FOREIGN PATENT DOCUMENTS

| GB | 2441221 | 2/2006 |
| JP | 58065977 | 4/1983 |

(Continued)

OTHER PUBLICATIONS

ComfortLink II XL950 Control, User Guide, Trane U.S. Inc., 2011.
(Continued)

*Primary Examiner* — Ryan A Jarrett
(74) *Attorney, Agent, or Firm* — The Law Offices of Konrad Sherinian LLC

(57) ABSTRACT

A control management system includes a network of wirelessly connected control systems, such as thermostats. The control systems can actuate systems such as heating systems, cooling systems, ventilation systems, humidity control systems, and/or other types of controls. The control systems can adjust or maintain temperature, humidity, lighting, or other timer and control functions. In at least some embodiments, the control management system provides at least one adjustable calendar. In at least some embodiments, the aforementioned calendar is perpetual, repeating each time period unless instructed to do otherwise by the control management system. Examples of instructions otherwise can include operator specified exception days, where on specified dates, the control management system will override the calendar with a custom setting.

20 Claims, 10 Drawing Sheets

(51) Int. Cl.
*F24F 11/61* (2018.01)
*F24F 11/52* (2018.01)
*F24F 11/65* (2018.01)
*F24F 11/30* (2018.01)
*F24F 140/00* (2018.01)
*F24F 11/64* (2018.01)
*F24F 110/10* (2018.01)

(52) U.S. Cl.
CPC .............. *F24F 11/61* (2018.01); *F24F 11/65* (2018.01); *G05B 15/02* (2013.01); *G05D 23/1917* (2013.01); *F24F 11/64* (2018.01); *F24F 2110/10* (2018.01); *F24F 2140/00* (2018.01)

(58) Field of Classification Search
CPC ........ F24F 11/30; F24F 2140/00; F24F 11/64; F24F 2110/10; G05B 15/02
See application file for complete search history.

(56) References Cited

U.S. PATENT DOCUMENTS

| | | |
|---|---|---|
| 2,253,418 A | 8/1941 | Sanders |
| 2,703,228 A | 3/1955 | Fleisher |
| 3,309,021 A | 3/1967 | Powers |
| 3,385,574 A | 5/1968 | Lohman |
| 3,481,588 A | 12/1969 | Lobb |
| 3,705,479 A | 12/1972 | Mcpherson |
| 3,724,824 A | 4/1973 | Mitich |
| 3,733,062 A | 5/1973 | Bracich |
| 3,774,588 A | 11/1973 | Yeagle |
| 3,799,517 A | 3/1974 | Tamm |
| 3,823,922 A | 7/1974 | McElreath |
| 4,036,597 A | 7/1977 | Filss |
| 4,056,582 A | 11/1977 | Chow |
| 4,075,864 A | 2/1978 | Schrader |
| 4,185,687 A | 1/1980 | Stockman |
| 4,316,256 A | 2/1982 | Hendricks et al. |
| 4,382,544 A | 5/1983 | Stewart |
| 4,399,031 A | 8/1983 | Imano et al. |
| 4,420,794 A | 12/1983 | Anderson |
| 4,606,401 A | 8/1986 | Levine |
| 4,730,941 A | 3/1988 | Levine et al. |
| 4,733,719 A | 3/1988 | Levine |
| 4,838,482 A | 6/1989 | Vogelzang |
| 4,948,040 A | 8/1990 | Kobayashi et al. |
| 4,967,382 A | 10/1990 | Hall |
| 5,023,432 A | 6/1991 | Boykin |
| 5,038,851 A | 8/1991 | Mehta |
| 5,171,486 A | 12/1992 | Penno |
| 5,230,482 A | 7/1993 | Ratz et al. |
| 5,259,445 A | 11/1993 | Pratt et al. |
| 5,289,362 A | 2/1994 | Liebl et al. |
| 5,428,964 A | 7/1995 | Lobdell |
| 5,482,209 A | 1/1996 | Cochran et al. |
| 5,491,615 A | 2/1996 | Nichols |
| 5,547,017 A | 8/1996 | Rudd |
| 5,566,879 A | 10/1996 | Longtin |
| 5,673,850 A | 10/1997 | Uptegraph |
| 5,697,552 A | 12/1997 | McHugh et al. |
| 5,765,636 A | 6/1998 | Meyer et al. |
| 5,782,296 A | 7/1998 | Mehta |
| 5,795,505 A | 8/1998 | Penno |
| 5,873,519 A | 2/1999 | Beilfuss |
| 5,924,486 A | 7/1999 | Ehlers et al. |
| 5,937,942 A | 8/1999 | Bias et al. |
| 5,983,146 A | 11/1999 | Sarbach |
| 6,116,512 A | 9/2000 | Dushane |
| 6,196,467 B1 | 3/2001 | Dushane |
| 6,205,533 B1 | 3/2001 | Margolous et al. |
| 6,211,782 B1 | 4/2001 | Sandelman et al. |
| 6,213,404 B1 | 4/2001 | Dushane |
| 6,241,156 B1 | 6/2001 | Kline et al. |
| 6,304,803 B1 | 10/2001 | Dao |
| 6,315,211 B1 | 11/2001 | Sartain |
| 6,318,639 B1 | 11/2001 | Toth |
| 6,415,023 B2 | 1/2002 | Iggulden |
| 6,435,418 B1 | 8/2002 | Toth et al. |
| 6,478,233 B1 | 11/2002 | Shah |
| 6,499,038 B2 | 12/2002 | Kitayama |
| 6,502,758 B2 | 1/2003 | Cottrell |
| 6,549,870 B2 | 4/2003 | Proffitt et al. |
| 6,595,430 B1 | 7/2003 | Shah |
| 6,617,954 B2 | 9/2003 | Firestine |
| 6,621,507 B1 | 9/2003 | Shah |
| 6,628,997 B1 | 9/2003 | Fox et al. |
| 6,714,222 B1 | 3/2004 | Bjorn et al. |
| 6,783,079 B2 | 8/2004 | Carey et al. |
| 6,814,299 B1 | 11/2004 | Carey |
| 6,824,069 B2 | 11/2004 | Rosen |
| 6,851,621 B1 | 2/2005 | Wacker et al. |
| 6,892,547 B2 | 5/2005 | Strand |
| 6,988,671 B2 | 1/2006 | DeLuca |
| 7,003,378 B2 | 2/2006 | Poth |
| 7,028,912 B1 | 4/2006 | Rosen |
| 7,047,092 B2 | 5/2006 | Wimsatt |
| 7,050,026 B1 | 5/2006 | Rosen |
| 7,055,759 B2 | 6/2006 | Wacker et al. |
| D524,663 S | 7/2006 | Moore |
| D525,154 S | 7/2006 | Moore |
| D527,288 S | 8/2006 | Moore |
| D527,658 S | 9/2006 | Moore |
| D530,633 S | 10/2006 | Moore |
| 7,114,554 B2 | 10/2006 | Bergman et al. |
| D531,528 S | 11/2006 | Moore |
| 7,142,948 B2 | 11/2006 | Metz |
| D533,793 S | 12/2006 | Moore |
| D534,088 S | 12/2006 | Moore |
| 7,146,253 B2 | 12/2006 | Hoog et al. |
| D534,443 S | 1/2007 | Moore |
| 7,156,317 B1 | 1/2007 | Moore |
| 7,156,318 B1 | 1/2007 | Rosen |
| D536,271 S | 2/2007 | Moore |
| 7,181,317 B2 | 2/2007 | Amundson et al. |
| 7,222,800 B2 | 5/2007 | Wruck |
| 7,225,054 B2 | 5/2007 | Amundson et al. |
| 7,274,972 B2 | 9/2007 | Amundson et al. |
| 7,287,709 B2 | 10/2007 | Proffitt et al. |
| 7,302,642 B2 | 11/2007 | Smith et al. |
| 7,306,165 B2 | 12/2007 | Shah |
| 7,320,110 B2 | 1/2008 | Shah |
| 7,360,717 B2 | 4/2008 | Shah |
| 7,438,469 B1 | 10/2008 | Moore |
| 7,454,269 B1 | 11/2008 | Dushane et al. |
| 7,489,303 B1 | 2/2009 | Pryor |
| 7,513,438 B2 | 4/2009 | Mueller |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,593,212 B1 | 9/2009 | Toth |
| 7,604,046 B2 | 10/2009 | Bergman et al. |
| 7,614,567 B2 | 11/2009 | Chapman, Jr. et al. |
| 7,636,604 B2 | 12/2009 | Bergman et al. |
| 7,693,582 B2 | 4/2010 | Bergman et al. |
| 7,693,583 B2 | 4/2010 | Wolff et al. |
| 7,703,694 B2 | 4/2010 | Mueller et al. |
| 7,706,923 B2 | 4/2010 | Amundson et al. |
| 7,748,225 B2 | 7/2010 | Butler et al. |
| 7,702,421 B2 | 8/2010 | Sullivan et al. |
| 7,775,454 B2 | 8/2010 | Mueller et al. |
| 7,784,291 B2 | 8/2010 | Butler et al. |
| 7,784,705 B2 | 8/2010 | Kasper et al. |
| 7,801,646 B2 | 9/2010 | Amundson et al. |
| 7,802,618 B2 | 9/2010 | Simon et al. |
| 7,845,576 B2 | 12/2010 | Siddaramanna |
| 7,861,941 B2 | 1/2011 | Schultz et al. |
| 7,867,646 B2 | 1/2011 | Rhodes |
| 7,941,819 B2 | 5/2011 | Stark |
| 7,954,726 B2 | 6/2011 | Siddaramanna et al. |
| 7,963,454 B2 | 6/2011 | Sullivan |
| D643,318 S | 8/2011 | Morrow |
| 7,992,794 B2 | 8/2011 | Leen et al. |

(56) References Cited

U.S. PATENT DOCUMENTS

| | | |
|---|---|---|
| 8,066,263 B1 | 11/2011 | Soderlund |
| 8,083,154 B2 | 12/2011 | Schultz et al. |
| 8,091,795 B1 | 1/2012 | McLellan |
| 8,167,216 B2 | 5/2012 | Schultz et al. |
| 8,175,782 B2 | 5/2012 | Gepperth et al. |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| 8,219,251 B2 | 7/2012 | Amundson et al. |
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 | 4/2014 | Moore et al. |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 9,989,273 B2 | 6/2018 | Read et al. |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0230402 A1 | 11/2004 | Jean |
| 2004/0245352 A1 | 12/2004 | Smith |
| 2004/0256472 A1 | 12/2004 | DeLuca |
| 2004/0260427 A1 | 12/2004 | Wimsatt |
| 2005/0027997 A1 | 2/2005 | Ueno et al. |
| 2005/0033707 A1 | 2/2005 | Ehlers |
| 2005/0040248 A1 | 2/2005 | Wacker |
| 2005/0040249 A1 | 2/2005 | Wacker |
| 2005/0044906 A1 | 3/2005 | Spielman |
| 2005/0082836 A1 | 4/2005 | Lagerwey |
| 2005/0108620 A1 | 5/2005 | Allyn et al. |
| 2005/0119793 A1 | 6/2005 | Amundson et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Koshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman et al. |
| 2007/0278320 A1 | 12/2007 | Lunacek et al. |
| 2008/0160491 A1* | 7/2008 | Allen ............... G09B 7/02 434/362 |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0045263 A1 | 2/2009 | Mueller et al. |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1* | 3/2010 | Harrod ............... G05B 19/042 700/277 |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 | 10/2010 | Rhoads et al. |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0046792 A1* | 2/2011 | Imes ............... F24F 11/63 700/278 |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0024685 A1 | 1/2013 | Kolavennu et al. |
| 2013/0032414 A1 | 2/2013 | Yilmaz |
| 2013/0090767 A1 | 4/2013 | Bruck et al. |
| 2013/0056989 A1 | 5/2013 | Sabhapathy |
| 2013/0123991 A1 | 5/2013 | Richmond |
| 2013/0211783 A1 | 8/2013 | Fisher et al. |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0081465 A1 | 3/2014 | Wang et al. |
| 2014/0098247 A1 | 4/2014 | Rao |
| 2014/0152631 A1 | 6/2014 | Moore et al. |
| 2014/0156087 A1 | 6/2014 | Amundson |
| 2014/0163746 A1 | 6/2014 | Drew |
| 2014/0254577 A1 | 9/2014 | Wright et al. |
| 2014/0316581 A1 | 10/2014 | Fadell et al. |
| 2014/0319233 A1 | 10/2014 | Novotny |
| 2015/0081568 A1 | 3/2015 | Land, III |
| 2015/0095843 A1 | 4/2015 | Greborio et al. |
| 2015/0100167 A1 | 4/2015 | Sloo et al. |
| 2015/0167995 A1 | 6/2015 | Fadell et al. |
| 2015/0233595 A1 | 8/2015 | Fadell |
| 2015/0280935 A1 | 10/2015 | Poplawski et al. |
| 2016/0047569 A1 | 2/2016 | Fadell et al. |
| 2016/0062618 A1 | 3/2016 | Fagan |
| 2016/0123618 A1 | 5/2016 | Hester et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2016/0286616 A1* | 9/2016 | van de Ven ........ H05B 33/0842 |
| 2017/0102681 A1 | 4/2017 | Verhoeven et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0329292 A1* | 11/2017 | Piaskowski ........ H04L 12/2809 |
| 2017/0364104 A1 | 12/2017 | Poplawski et al. |
| 2018/0005195 A1* | 1/2018 | Jacobson ........... G06Q 10/1095 |
| 2018/0031266 A1 | 2/2018 | Atchison |

FOREIGN PATENT DOCUMENTS

| | | |
|---|---|---|
| JP | 2004218436 | 8/2004 |
| JP | 2006009596 | 1/2006 |
| KR | 20050034417 | 4/2005 |

OTHER PUBLICATIONS

Cardio Iie Installer's Guide, System Version 2.5xx, 5th edition, 2008, Secant Home Automation Inc.

(56) References Cited

OTHER PUBLICATIONS

What you should know about flexible displays (FAQ); http://news.cnet.com/8301-1035_3-57607171-94/what-you-should-know-about-flexible-d . . . ; Nov. 25, 2013.
Brae8urn Systems LLC, "Temperature Limiting Adjustments for heating and Cooling (1000 Series)", Mportant Installation Instructions.

\* cited by examiner

CONTROL MANAGEMENT SYSTEM HAVING PERPETUAL CALENDAR WITH EXCEPTIONS

CROSS-REFERENCE TO RELATED APPLICATIONS

This application is related to and claims priority from U.S. Provisional Application No. 62/396,639 filed Sep. 19, 2016 entitled "Climate Control Management System Having Perpetual Calendar with Exceptions". The '639 application is hereby incorporated by reference in its entirety.

FIELD OF THE INVENTION

The present invention relates to climate control and related management systems, and more specifically to climate control and timer management systems having calendars and/or schedules to manage the control systems.

Control systems exist in many forms, some of the most common being thermostats connected to HVAC systems and equipment timers such as those found on refrigeration defrosters and/or pool cleaning equipment. Control systems are located in a variety of settings, from domestic dwellings to commercial warehouses. Residential systems often include central or convective heating systems, as well as air conditioners and pools. Such systems can also be coupled with humidifiers to further refine the environment. Individual rooms or zones within a building can be host to different climactic conditions at different times which are managed by control systems. A variety of methods exist for adjusting and controlling these systems.

The adjustment and setting of control systems (such as thermostats) and the related programming determine how HVAC equipment is modulated and for what duration the equipment runs. Control systems can be managed by control management systems. Computer systems, mobile applications, and other methods can be used to manage multiple controls which in turn control associated HVAC systems.

Management systems can be wired or wireless, and often include a calendar function, wherein each control can be assigned a specific program on a specific day. These calendars often operate on a weekly basis, wherein each day of a week can hold different settings for the associated control system. Some calendar systems can also operate on a seasonal basis. For example, users may want to designate buildings where the building's heating systems are not available for use during the summer months.

Individual control systems (such as thermostats) have been proposed having a plurality of features for calendars and scheduling. However, what is needed is a way for managing a network of control systems, such that the same calendar (or portions of a calendar) can be assigned to one or more control systems within the network. There is a need for a system and method for managing and monitoring multiple control systems according to a calendar schedule.

SUMMARY OF THE INVENTION

A system and method of managing a network of control systems is disclosed. Control management systems can provide calendar(s), allowing an operator to program a schedule. In some embodiments, the calendar is perpetual, in that the settings repeat by default over a specified period of time. However, the calendar can provide for a series of exception days. In some embodiments, the exceptions are programmed by the operator. In some embodiments, the control system is a climate control system. In some embodiments, the control system manages various applications and/or devices such as, but limited to, lighting, digital timers, pressure controls, defrost controls, fan controls, water heating and cooling, and/or solar panel controllers. In some embodiments, the devices and/or applications are configured to communicate via a network, such as the internet.

The exception days can be determined through a variety of methods and/or can be imported from other calendar software, or programmed by the operator directly. Exception days are beneficial to a perpetual control schedule for a variety of reasons. Pre-planned events such as vacations and/or holidays often result in a desire and/or need to adjust the climate of a space for a variety of reasons, including, but not limited to, increasing an occupants comfort and/or saving money and energy.

In some embodiments, a control management system controls a network of at least one control system. In some embodiments, the control system is a thermostat. In some embodiments, the control management system has at least one electronically displayed calendar, which controls at least one of the control systems. In some embodiments, a single calendar can control multiple systems (for example, various thermostats in a single building can be set to the same temperatures each day using the same calendar).

In other embodiments, one calendar can control a single system on the network. The at least one calendar can have a weekly scheduling capability, wherein a weekly schedule can be set such that each day of the week has specified conditions set forth for the control systems controlled by the control management system having the calendar. In some embodiments, the operator can create operator specified exceptions to the weekly schedule. The operator specified exceptions can alter the control system programming on operator specified dates of the calendar.

In at least one embodiment, these operator-specified exceptions can be additionally selected from a listing of common exception days. Common exception days can include holidays, birthdays and/or the like. In some embodiments, common exception days can be set and/or selected by the operator. In the same or other embodiments, common exception days can be imported from a calendar program. In some embodiments, operators can select from school and/or business calendars, and/or utilize personal calendars from mobile devices and/or computers.

In some embodiments, operator specified exceptions can include, but are not to be limited to, common exception days which are populated by an operator responding to an interrogative. Interrogatives can cover material such as holidays celebrated, location of the control systems to be managed by the calendar, religious preferences, type of building in which the control system resides, and/or other questions.

A method of regulating a network of at least one control system can comprise a series of steps. In some embodiments, the network is regulated by providing a weekly calendar. The weekly calendar can be configured with weekly settings, which are associated with a plurality of times of days, and days of the weekly calendar. A list of exception dates can then be provided to the weekly calendar via various methods depending on the chosen embodiment. The exception dates can be configured with custom settings, and they can override the weekly settings of the weekly calendar on the exception date, replacing the weekly settings with the custom settings on the exception date. In some embodiments, the method can be performed using a wired or wireless controller for the control management system.

DETAILED DESCRIPTION OF SOME ILLUSTRATED EMBODIMENT(S)

Figure 1:
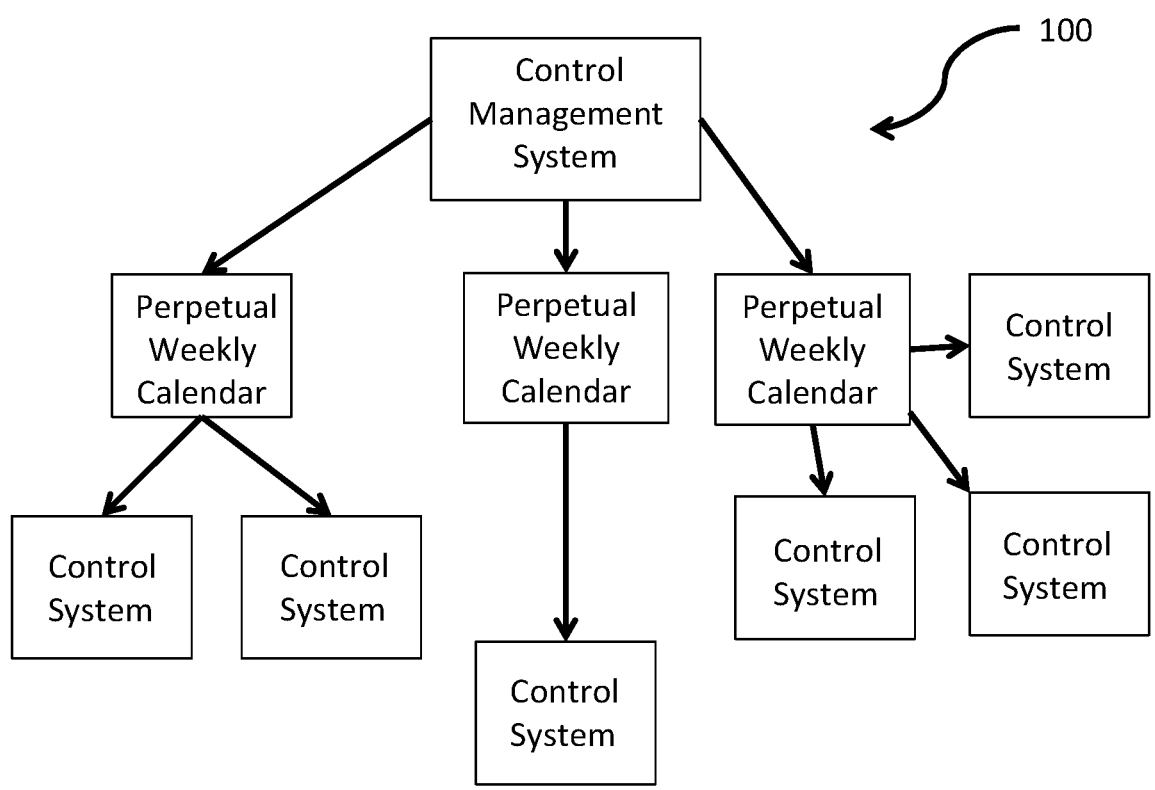
FIG. 1 is a schematic diagram of how a control management system is structured in some embodiments, using a plurality of perpetual calendars controlling various control systems.

In at least some embodiments, a control management system comprises a network of wirelessly connected control systems, such as thermostats. The control systems can actuate systems such as, but not limited to, heating systems, cooling systems, ventilation systems, humidity control systems, and/or other types of environmental controls. The control systems can adjust or maintain temperature, humidity, ventilation, lighting, and/or other environmental factors. In some embodiments, the control management system provides at least one adjustable perpetual calendar and/or schedule. In other or the same embodiments, the control management system provides at least one adjustable monthly calendar. In yet other or the same embodiments, the control management system provides at least one adjustable yearly calendar.

In at least some embodiments, the calendars are perpetual, repeating each week, month, and/or year unless instructed to do otherwise by the control management system. Examples of instructions that can override the perpetual calendar can include, but are not limited to, operator specified exception days, where on specified dates the control management system can override the calendar(s) with custom setting(s).

In at least some embodiments, the calendars provide the ability to group a plurality of days of the week, to synchronize settings therebetween. The calendars can provide different settings based on time of day. In some embodiments, settings can be precisely set in time intervals. In some embodiments, intervals are as short as a minute. In other or the same embodiments, time slots can be a selection of hours, colloquially acknowledged times of day (morning, afternoon, evening, night), and/or entire days. In some embodiments, the calendars can be set with a single set of parameters.

In some embodiments, the control management system can provide a plurality of suggested common exception days. Suggested common exceptions days can include but not be limited to birthdays, holidays, planned vacations, hosted events, demand response energy adjustment events, and/or industrial events, depending on the control system being overseen by the calendar. In some embodiments, common exception days can also be imported from an electronic calendar program, wherein events warranting custom control settings can be selected from an existing calendar, and/or read directly therefrom by a computer in the control management system.

In some embodiments, an operator at an access portal for the control management system (such as, but not limited to, a central terminal, individual control system, and/or mobile device) can respond to a series of prompts to determine common exception days for the individual application of the control system managed by the calendar. Prompts can pertain to the location of the control system, the use of that location on a regular basis, potential sources of importable calendars (for instance, if the control system is housed within a school, the school calendar is a potential source of importable exception days), and/or a multitude of other questions. The prompts can ask about religious or holiday preferences, dates of birthdays, notable gatherings, and the like. In some embodiments, the prompts can suggest custom settings for exception days based on the type of exception day. Operator specified settings determined by prompting for common exception days can comprise the entirety of exception days acknowledged by the calendar, a subset of exception days acknowledged by the calendar, or none of the exception days acknowledged by the calendar.

In some embodiments, indication of the current day being an exception day occurs. In some embodiments, indicia displayed on the screen of a control device can show that an exception day is currently occurring. Similarly, indicia can be present on the screen of a portal used to adjust the settings of the control management system, such as on the screen of a mobile device or terminal. These indicia can comprise, among other things, ASCII characters, words, symbols, pictures and/or colors. Indicia can be accompanied by a change in the color of a screen. The screen can be present on a control device managed by the calendar having the current exception day. In some embodiments, the screen can also be present on a portal to adjusting the calendar of the control management system. Other forms of indicia can include a special light and/or other notable indicator on the portal to the calendar of the control management system, the control system itself, and/or on a separate component of the control management system. In at least some embodiments, a blue or green color is used in the backlight of a screen on the control system itself to indicate the presence of an exception day.

In some embodiments, the control management system and perpetual calendar are combined in the same hardware and/or software. In some embodiments, the control management system and perpetual calendar are contained in separate hardware and/or software. In some embodiments, some components of the control management system are combined in part with the perpetual calendar, and/or some components of the perpetual calendar are combined in part with the control management system.

FIG. 1 outlines basic hierarchy 100 of command for the control management system. In the embodiment shown, the control management system has a plurality of perpetual calendars, each controlling at least one control system. Alternative or vestigial calendars can also be present within this control management system that do not actively manage a control system. In some embodiments, multiple calendars can actively manage a single control system. In some embodiments, one calendar can actively manage a single control system. In some embodiments, one calendar can control multiple control systems.

In some embodiments, a number of calendars can manage a single control system. Often in these embodiments, the calendars have a predetermined hierarchy, such that only one calendar controls the control system during a given time period. The time period can be, among other periods, daily, weekly, monthly, and/or seasonally. Additionally, in some embodiments, calendars are able to import lists of exception days from one another, to make programming easier for the operator.

Figure 2:
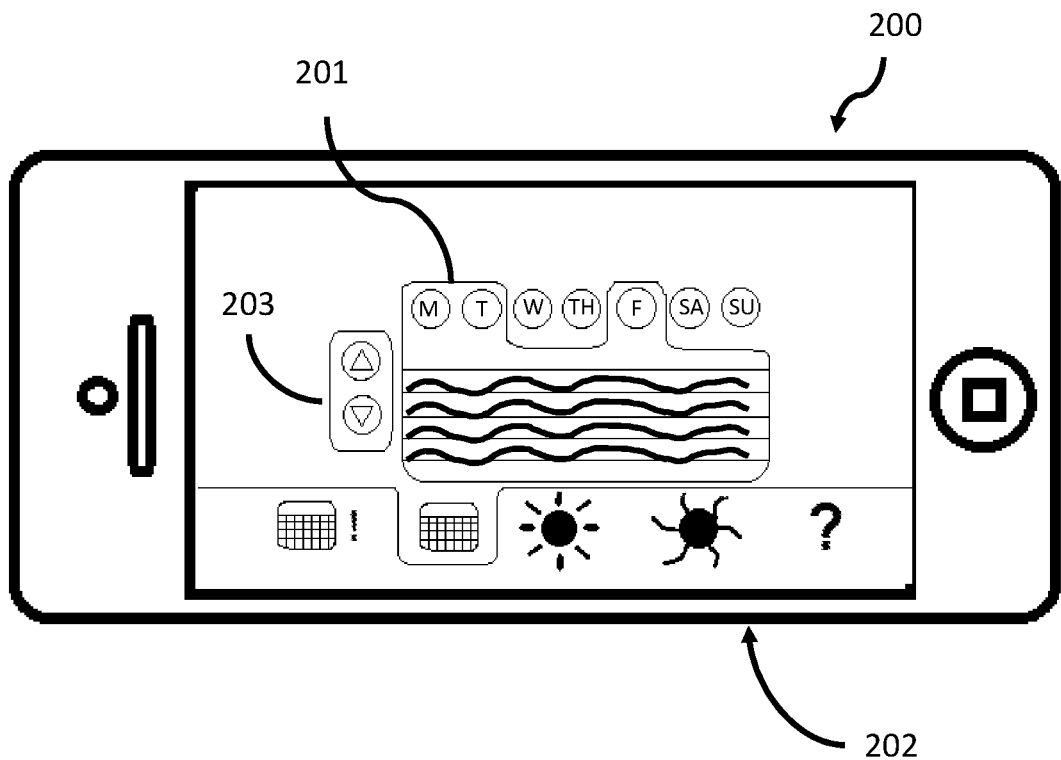
FIG. 2 is an overhead view of a mobile device adjusting a calendar of a control management system.

FIG. 2 is an overhead view of interface (generally indicated by 200) to calendar 201 of the control management system presented on mobile device 202. A plurality of soft buttons 203 are provided, wherein adjustments to calendar 201 can be made by using soft buttons 203 to select subsets of data within calendar 201. In some embodiments, days of the week in calendar 201 can be grouped together such that multiple days can be programmed at the same time. This enables an operator to more easily program the days of the perpetual calendar provided by the control management system. It should be noted that groups need not correspond to traditional groupings such as traditional business days and weekend days but, at least in some embodiments, are completely customizable by an operator.

Figure 3:
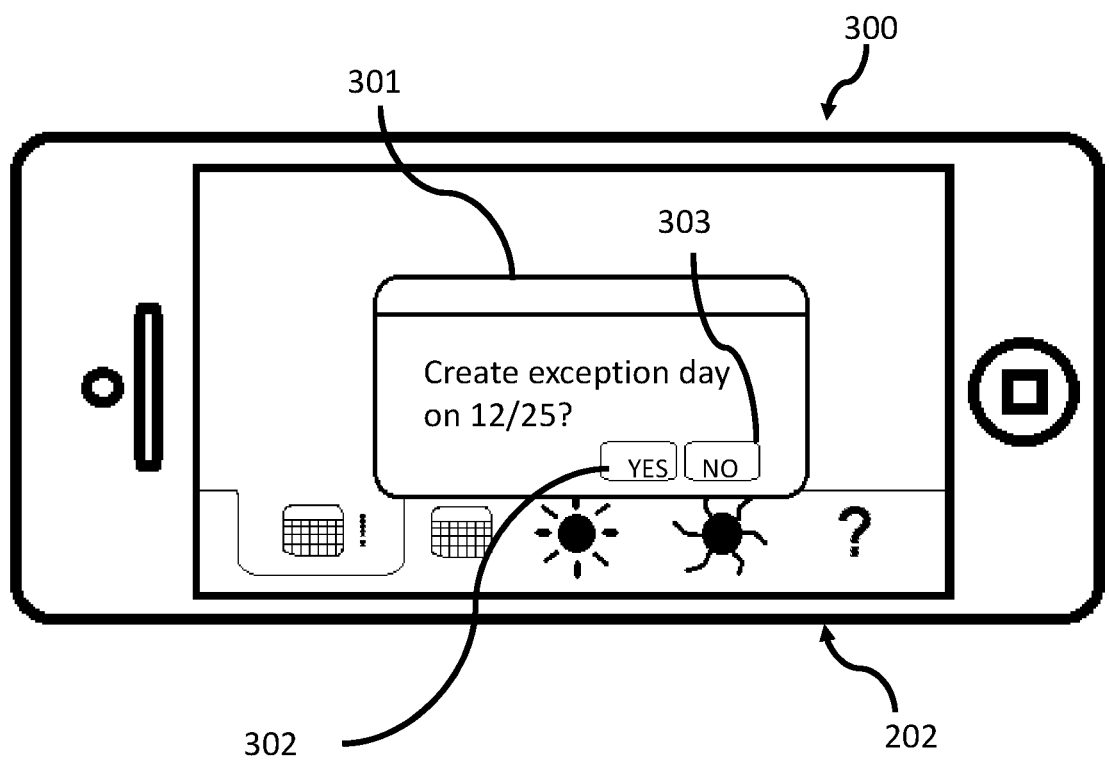
FIG. 3 is an overhead view of a mobile device screen in the process of creating an exception day to a calendar of a control management system.

FIG. 3 is an overhead view of an interface for creating exception days within a calendar (generally indicated by 300). The interface is shown to be on mobile device 202, however other interfaces can accomplish this same task. Soft buttons 302 and 303 are provided to assist the operator in responding to prompt 301 to create an exception day on December 25$^{th}$.

Figure 4:
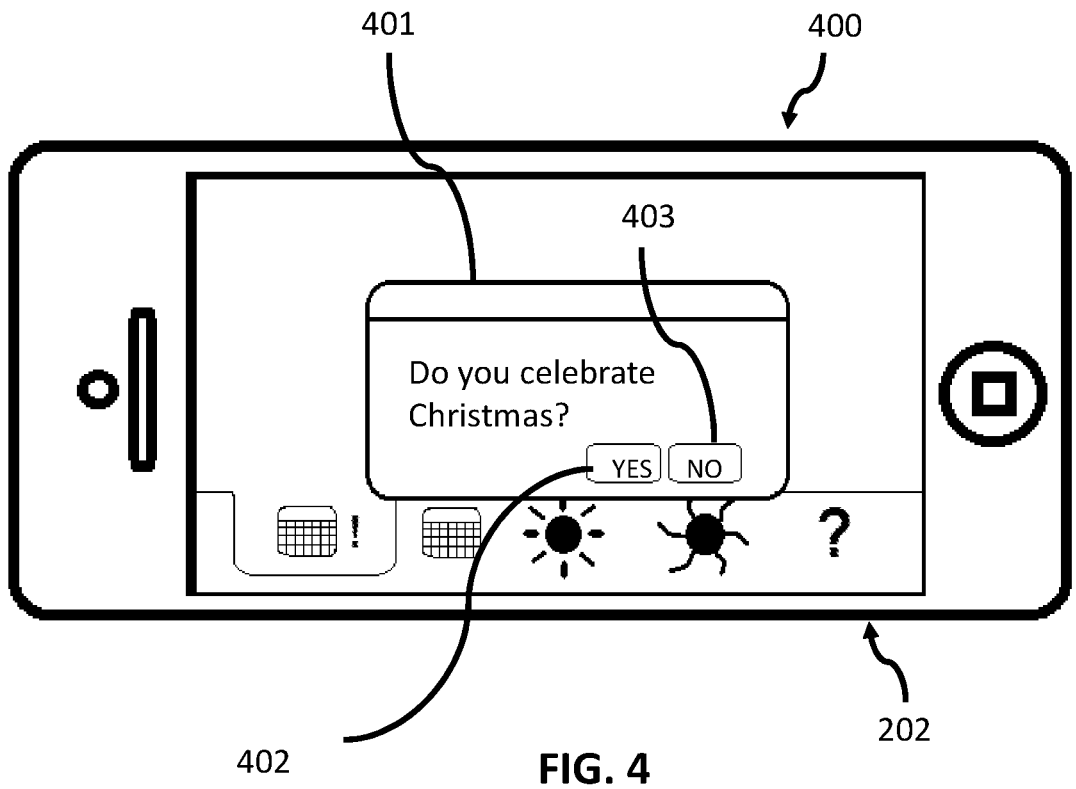
FIG. 4 is an overhead view of a mobile device screen displaying an interrogative from an operator interview process, wherein an operator can respond to a prompt to generate a listing of operator specified exception days.

FIG. 4 is a similar overhead view of an interface for creating exception days by using interrogatives regarding holidays (generally indicated by 400). Soft buttons 402 and 403 are provided to assist the operator in responding to prompt 401 to create an exception day.

Figure 5:
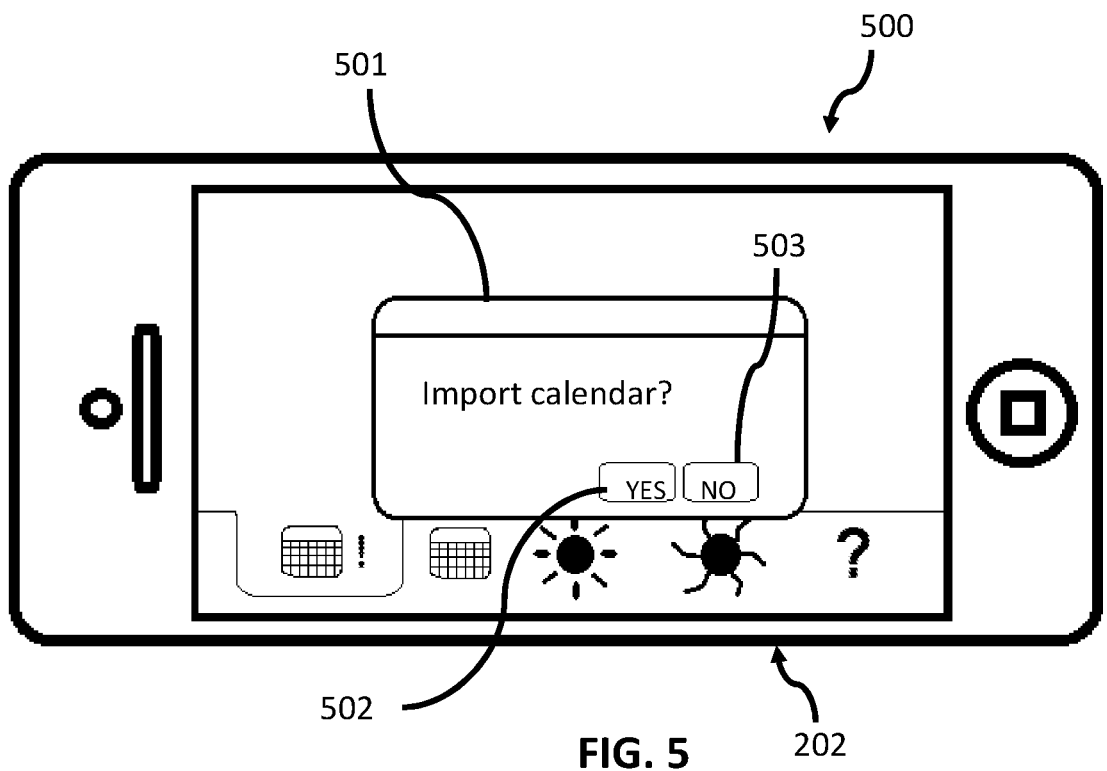
FIG. 5 is an overhead view of a mobile device screen displaying an option to import a listing of common exception days from an electronic calendar program.

FIG. 5 is an overhead view of an interface for creating exception days within a calendar (generally indicated by 500). In this and similar embodiments, an operator is prompted to import a calendar from calendar software, including third-party software, using interrogative window 501. In some embodiments, an operator can use soft buttons 502 and 503 to respond to the prompt with a "yes" or "no" answer. Using this interface and/or similar interfaces, an operator can generate a list of exception days which have already been noted in a calendar program. In other embodiments, the calendar program can be part of, among other things, a mobile device, a web-based program, a school calendar, business calendar, personal calendar and/or another calendar which pertains to the environment in which the control systems managed by the calendar reside. In some embodiments, the list of exception days to be imported can be in file formats such as a comma separated, tab delimited, excel and/or other commonly available file formats.

In some embodiments, importation can be performed wirelessly. In other or the same embodiments, importation can be performed using a wired connection. In other embodiments, this importation can be performed using a calendar contained on the device used to access the interface to the control management system.

Figure 6:
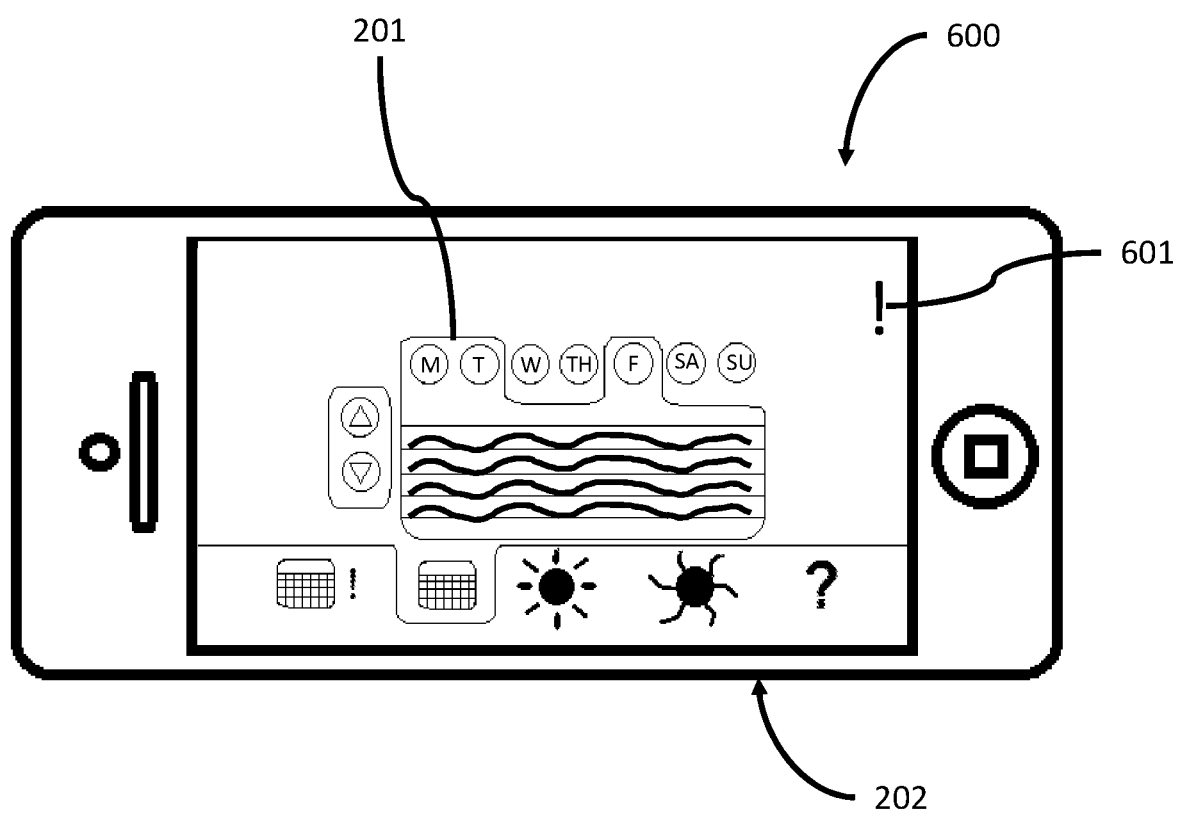
FIG. 6 is an overhead view of a mobile device observing a calendar of a control management system wherein a current exception day is indicated by indicia in the form of an ASCII character.
Figure 7:
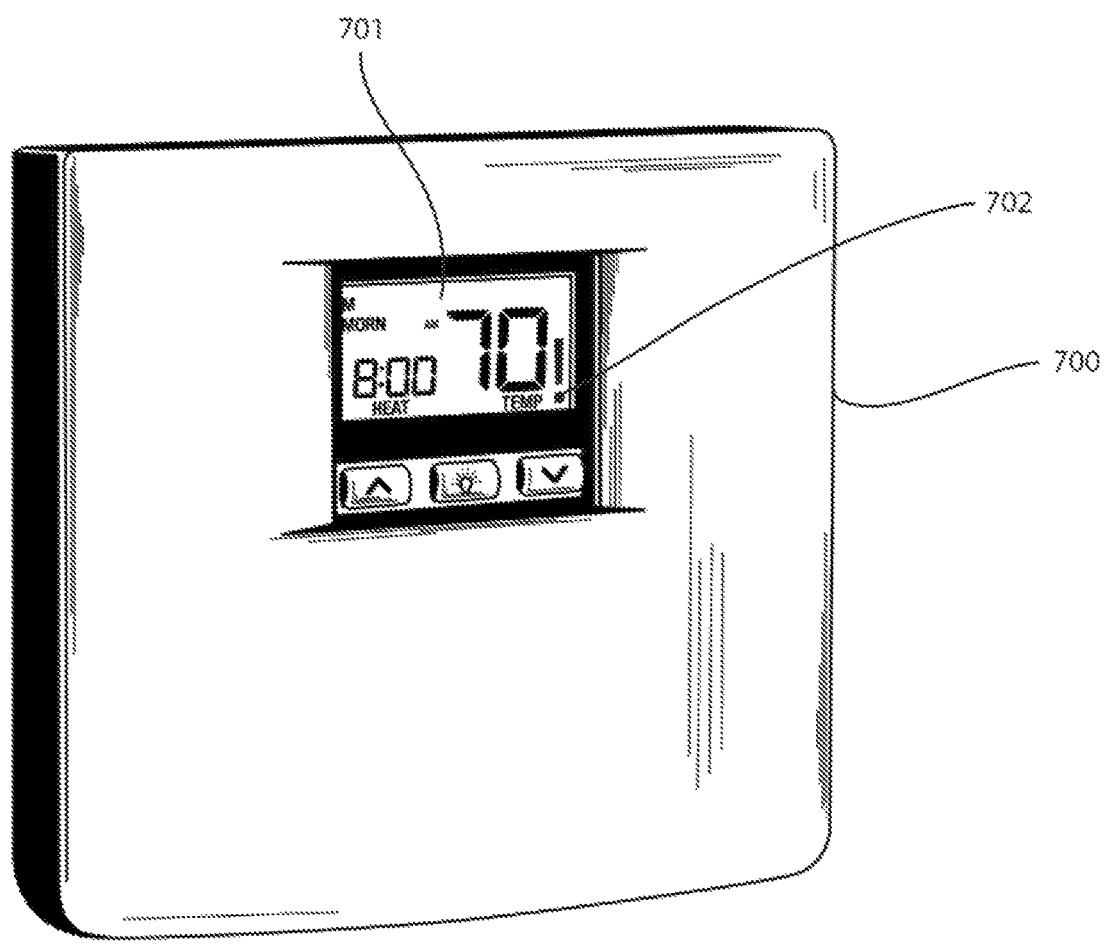
FIG. 7 is a perspective view of an example control device wherein a current exception day is indicated by indicia in the form of an ASCII character on the screen.

FIG. 6 shows an interface to the control management system indicating the presence of a current exception day (generally indicated by 600). In the embodiment detailed in FIG. 6, indicia 601 (in the form of an exclamation point in the top right corner of the interface) shows that it is presently an exception day. Similarly, FIG. 7 shows control device 700, having screen 701, which shows indicia 702 to alert the operator that it is an exception day. In some embodiments, the indicia can be characters, words, pictures, and/or a color change in the screen of control device or interface to the control management system. In some embodiments, the color change of the screen can be from green to blue. In some embodiments, the text color of the screen can change. In some embodiments, a backlight is present in the screen and can change colors to show the presence of an exception day.

Figure 8:
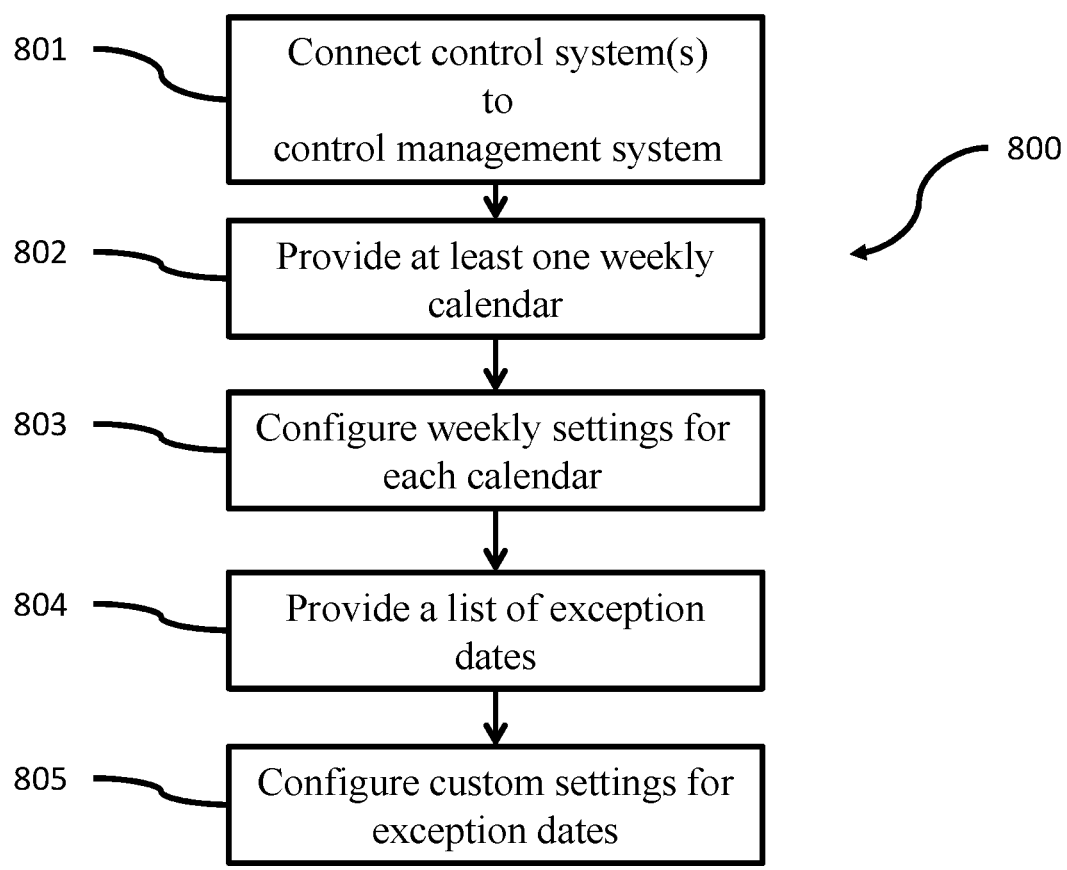
FIG. 8 is a flow chart showing a method of regulating a network of at least one control system.

FIG. 8 is a flow diagram of method 800 for regulating a network of at least one control system. Method 800 starts at 801 wherein the control system or systems are connected to the control management system, thus establishing a network of control systems to be managed. In some embodiments, these connections are made wirelessly.

At 802, the control management system provides at least one weekly calendar such as those detailed above. In some embodiments, a single calendar controls each control system. In other embodiments, multiple calendars can control a control system. In some embodiments, one calendar can control multiple control systems.

At 803, an operator can configure weekly settings for each calendar. In some embodiments, these weekly settings are perpetual, and repeat continuously unless overridden by an exception day.

At 804, a list of exception dates are provided. In some embodiments, these dates are directly programmed by the operator. In other or the same embodiments, exception dates are selected from a list of suggested dates, populated by geographical, institutional, religious, and/or other operator given information. In some embodiments, exception dates can be imported from programs having calendars and/or from files having a format wherein data values are separated and/or readable. In some embodiments, combinations of the above methods of populating this list are used to create a list of exception dates.

At 805, an operator configures custom settings for each of the exception dates. In some embodiments, the operator can copy settings from one date to another. Additionally, the settings can be read from various file types, including but not limited to, delimited files.

Figure 9:
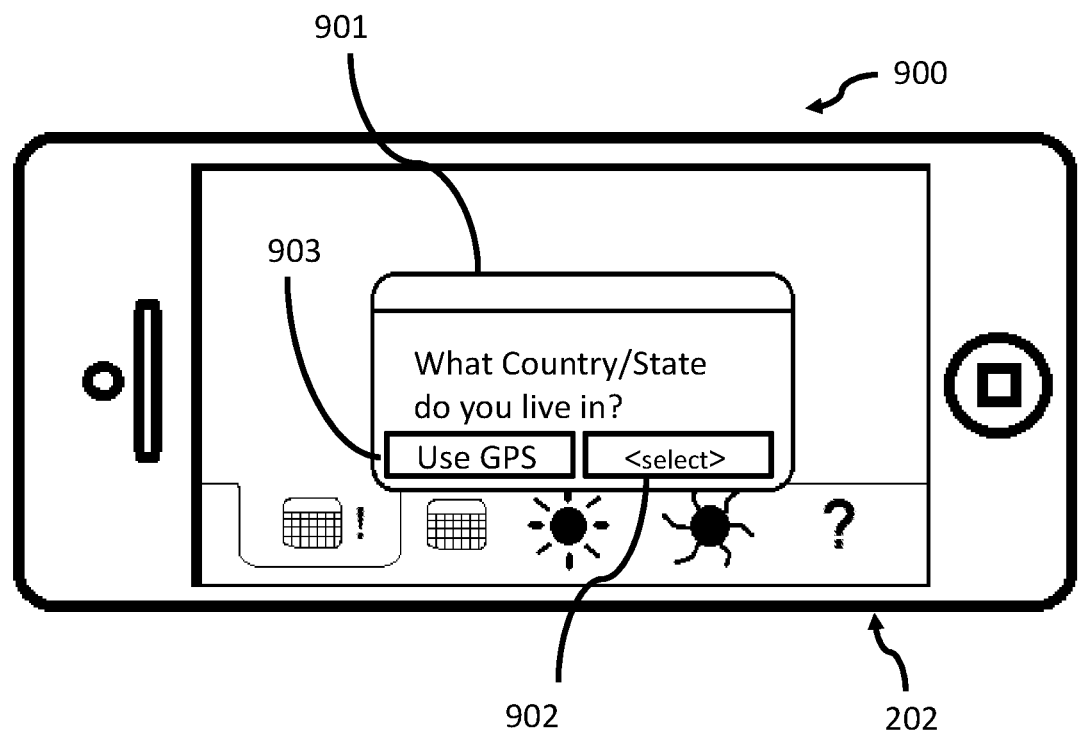
FIG. 9 is an overhead view of a mobile device screen displaying an option to generate a listing of common exception days based on geographic location.

FIG. 9 shows an embodiment wherein a prompt to assist in the generation of a list of common exception days (generally indicated as 900) requests geographical information via window 901. In this embodiment, the operator has the choice of using GPS coordinates of the interface device and/or the GPS coordinates of the individual control systems being managed by the control management system to provide geographical information via soft button 903. Alternatively, this information can be provided manually using a soft button 902. In some embodiments, this information can be used in conjunction with time zone and overall weather patterns provided by third-party sources and/or internal monitoring systems to suggest exception dates.

Figure 10:
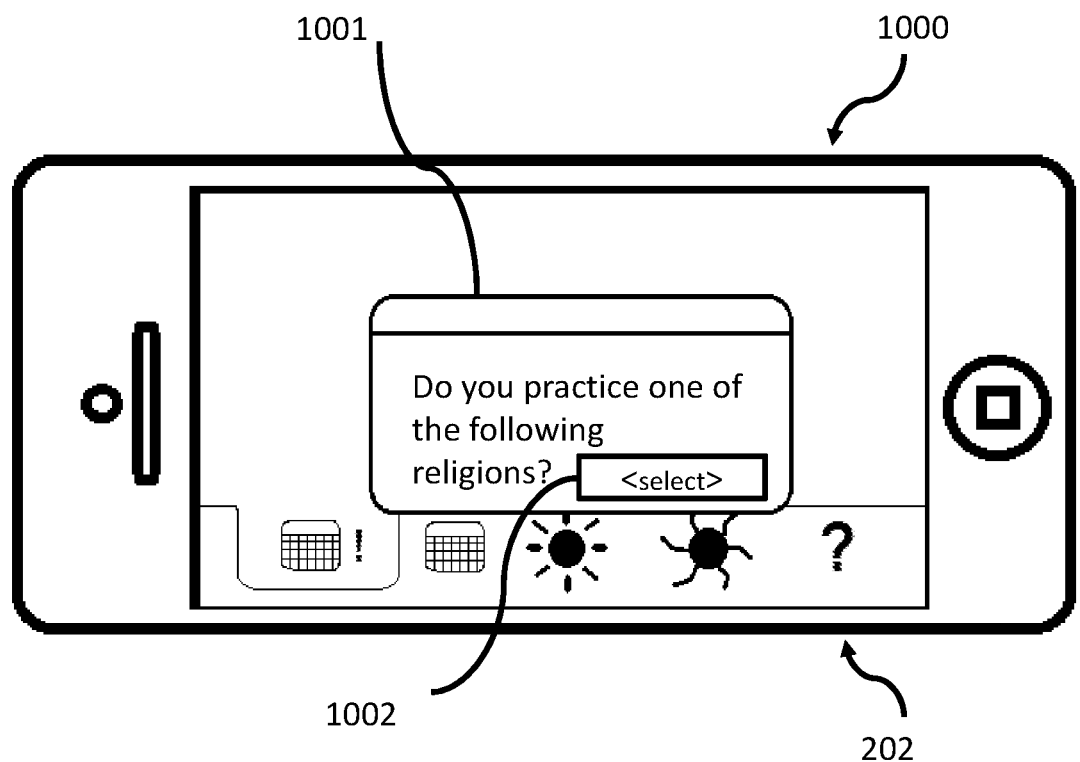
FIG. 10 is an overhead view of a mobile device screen displaying an option to generate a listing of common exception days based on religious preference.

FIG. 10 shows an embodiment (generally indicated as 1000) wherein window 1001 allows an operator to select from a list of common religions using soft button 1002 wherein these common religions have a number of acknowledged holidays that the operator can add to a list of exception dates for the calendar.

Figure 11:
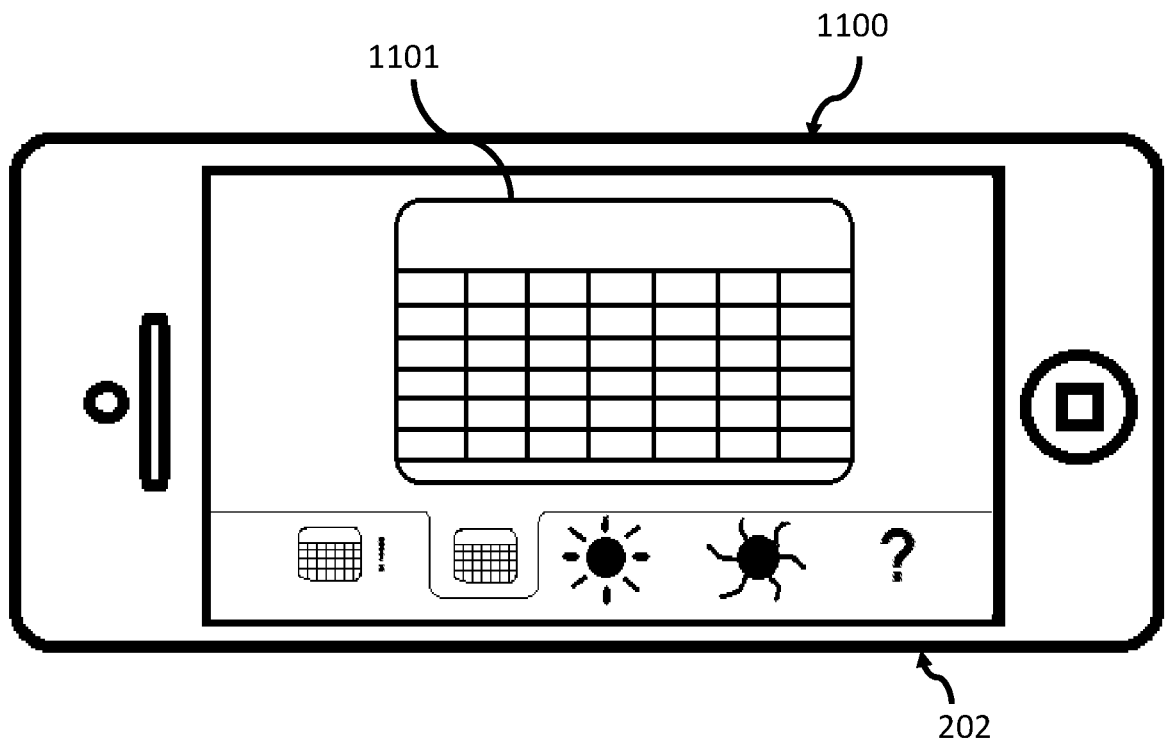
FIG. 11 is an overhead view of a mobile device observing a calendar of a control management system wherein the calendar is viewed in a monthly layout, and exception days can be marked.

FIG. 11 shows an embodiment (generally indicated as 1100) wherein calendar 1101 has a monthly view in addition to the weekly view provided by calendar 201. Indicia such as color changes, characters, pictures and/or words can be present on exception dates of this calendar for easy operator reference.

Figure 12:
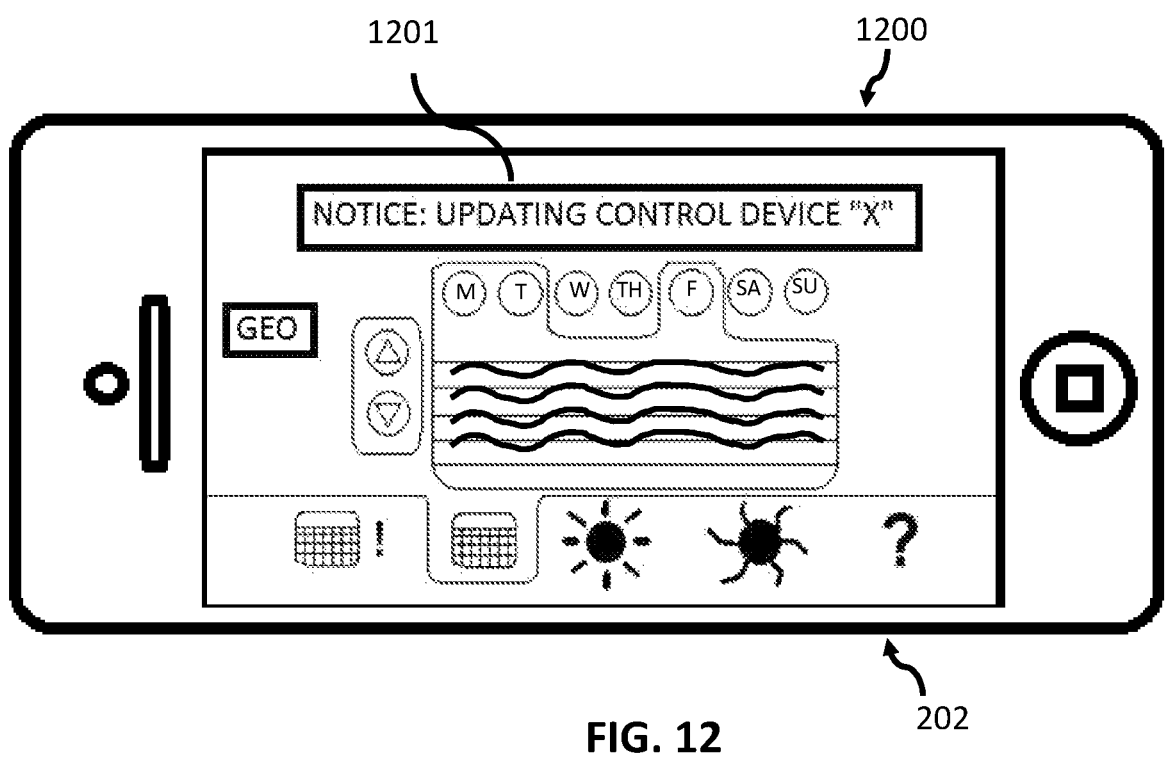
FIG. 12 is an overhead view of a mobile device observing a calendar of a control management system wherein the calendar is adjusted based on the geolocation of mobile devices relative to the control system(s).

FIG. 12 shows an embodiment (generally indicated by 1200) wherein window 1201 indicates that an operator has activated a geolocation option. In some embodiments, this option automatically alters a calendar of a control device based on a mobile device 202 being at a specific location. In some embodiments, a calendar is altered by the mobile device being within a specified distance of a control device. In some embodiments, a calendar is altered by a mobile device being outside a specified radius from a control device. In some embodiments, a mobile device entering the radius of one control device will cause a second control device to be updated. In some embodiments, multiple control device calendars are updated based on the position of a mobile device.

Figure 13:
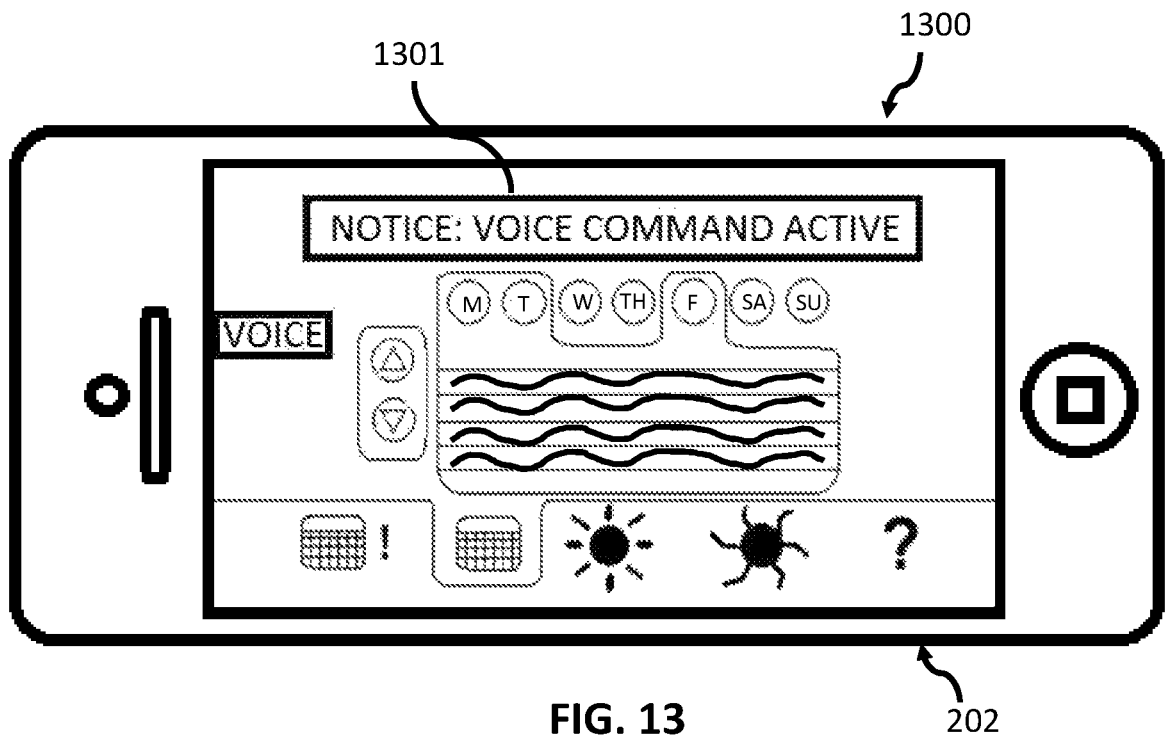
FIG. 13 is an overhead view of a mobile device observing a calendar of a control management system wherein the calendar is adjusted based on the monitoring of voice control technology.

FIG. 13 shows an embodiment (generally indicated by 1300) wherein window 1301 indicates that a voice command mode has been activated, wherein voice commands detected by mobile device 202 and/or linked devices can be used to update a calendar of a control system. In some embodiments, these linked devices can include linked devices and/or mobile devices having software capable of voice recognition.

In some embodiments, events for a calendar can be sourced automatically through scanning email, text messages, and/or similar media present in connection with a mobile device. In some embodiments, this scanning can occur automatically. In some embodiments, this scanning can occur on a predetermined schedule. In some embodiments, scanning can be initiated via the use of hard buttons on a mobile device, soft buttons on a mobile device, and/or voice commands. In some embodiments, voice commands can be received and/or interpreted by a control system directly.

Figure 14:
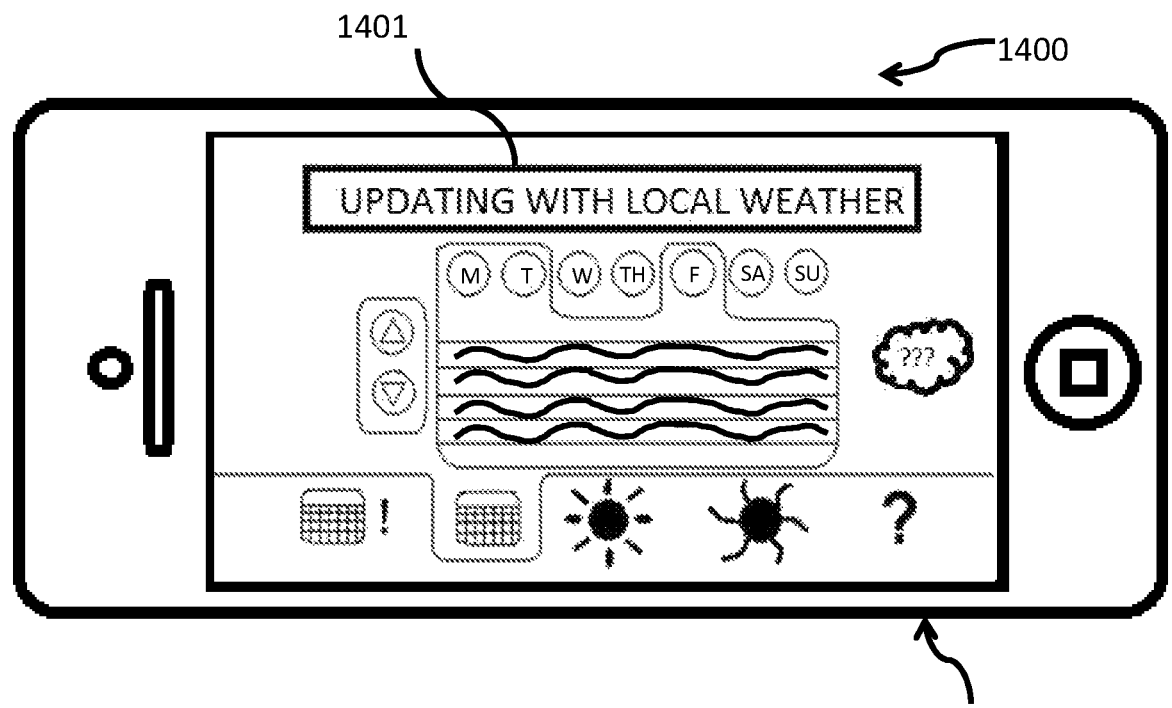
FIG. 14 is an overhead view of a mobile device observing a calendar of a control management system wherein the calendar is adjusted based on the local weather.

FIG. 14 shows an embodiment (generally indicated by 1400) wherein a mobile device 202 can configure a calendar to be modified in conjunction with local weather patterns. In some embodiments, this calendar is automatically updated after a given time period. In the illustrated embodiment, window 1401 indicates to an operator that a calendar is updating based on local weather. In some embodiments, local weather data is sourced from software installed on a mobile device.

Figure 15:
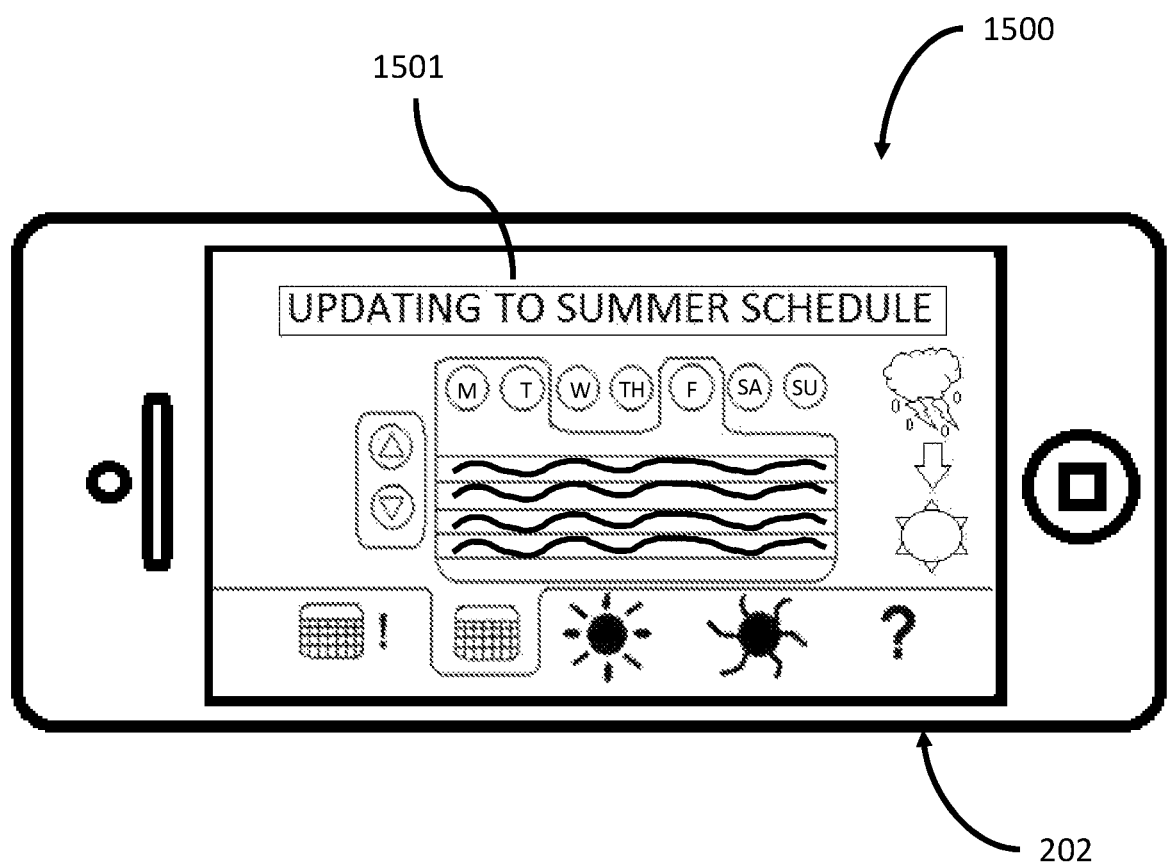
FIG. 15 is an overhead view of a mobile device observing a calendar of a control management system wherein the calendar is adjusted based on the season of the year.

FIG. 15 shows an embodiment (generally indicated by 1500) wherein a mobile device 202 can configure a calendar to be modified in conjunction with a changing season. In the illustrated embodiment, the season change is from spring to summer as is indicated by window 1501. In some embodiments, seasonal changes can be made on specifically programmed dates. In some embodiments, these dates can be imported from various digital sources such as online almanacs, personal calendars, business calendars, school calendars, online calendars, and/or other digital medium with indicators of seasonal changes. In some embodiments, seasonal changes can be imported from local climate and weather data centers near a mobile device and/or control system.

In some embodiments, a calendar(s) can be updated to have a control system pre-cool an environment if local weather patterns indicate a given day will be hot. In some embodiments, a calendar(s) can be updated to have a control system pre-warm an environment if local weather patterns indicate a given day will be cold. In some embodiments, a calendar can use local humidity information to adjust control system temperatures relative to how a given environment will feel for a person in that environment. In some embodiments, these adjustments are done automatically. In some embodiments, the adjustments are suggested to a user who can them approve them.

While particular elements, embodiments and applications of the present invention have been shown and described, it will be understood, that the invention is not limited thereto since modifications can be made without departing from the scope of the present disclosure, particularly in the light of the foregoing teachings.

What is claimed is:

1. A climate control and management system comprising:
   (a) a mobile interface running on a mobile device; and
   (b) a thermostat, said thermostat adapted to be connected to and control a heating system, a cooling system, a ventilation system or a humidity control system, said thermostat having:
      (1) a wireless interface, said wireless interface enabling said thermostat to connect with said mobile device, said thermostat adapted to be managed by said mobile interface, said thermostat adapted to be controlled by a calendar, said calendar configured by said mobile interface and including calendar settings and exception days, said exception days adapted to be automatically adjusted by said mobile interface based on a geographical location of said mobile device and a geographical location of said thermostat, wherein said exception days are also adapted to be manually configured through said mobile interface; and
      (2) a display screen adapted to display one or more settings of said calendar settings.

2. The climate control and management system of claim 1 wherein said calendar is configured to further control a second thermostat that is different from said thermostat, said second thermostat having a second wireless interface that allows said second thermostat to connect to said mobile device.

3. The climate control and management system claim 1 wherein said exception days are:
   (1) generated based on said geographical location of said mobile device wherein said geographical location of said mobile device indicates GPS coordinates of said mobile device; or (2) generated based on said geographical location of said thermostat wherein said geographical location of said thermostat indicates GPS coordinates of said thermostat.

4. The climate control and management system claim 3 wherein said exception days override a periodic calendar setting of said calendar.

5. The climate control and management system of claim 4 wherein said display screen is adapted to display an exception day indicia on said exception days, wherein said exception day indicia is a character, a word, a picture, a color change on said display screen, a text color change, or a backlight color change.

6. The climate control and management system of claim 1 wherein said mobile interface is a mobile app.

7. The climate control and management system of claim 1 wherein at least one setting of said calendar settings indicates a day, a time of said day and a temperature.

8. A climate control and management system comprising:
(a) a mobile interface running on a mobile device; and
(b) a control system, said control system adapted to be connected to and control an environmental control system, said control system comprising:
(1) a wireless interface, said wireless interface enabling said control system to connect with said mobile device, said control system adapted to be managed by said mobile interface, said control system adapted to be controlled by a calendar, said calendar configured by said mobile interface and including calendar settings and exception days, said exception days adapted to be automatically adjusted by said mobile interface based on a geographical location of said mobile device and a geographical location said control system, wherein said exception days are also adapted to be manually configured through said mobile interface; and
(2) a display screen adapted to display one or more settings of said calendar settings.

9. The climate control and management system of claim 8 wherein said calendar is configured to further control a second control system that is different from said control system, said second control system having a wireless interface that allows said second control system to connect to said mobile device.

10. The climate control and management system of claim 9 wherein said second control system is a thermostat.

11. The climate control and management system of claim 8 wherein said exception days are:
(1) generated based on said geographical location of said mobile device wherein said geographical location of said mobile device indicates GPS coordinates of said mobile device; or
(2) generated based on said geographical location of said control system wherein said geographical location of said control system indicates GPS coordinates of said control system.

12. The climate control and management system of claim 11 wherein said exception days override a periodic setting of said calendar.

13. The climate control and management system of claim 12 wherein said display screen is adapted to display an exception day indicia on said exception days, where said exception day indicia is a character, a word, a picture, a color change on said display screen, a text color change, or a backlight color change.

14. The climate control and management system of claim 13 wherein said control system is a thermostat.

15. The climate control and management system of claim 8 wherein said control system is a thermostat.

16. The climate control and management system of claim 15 wherein said environmental control system is one of a heating system, a cooling system, a ventilation system, a humidity control system, a lighting system, a digital timer, a pressure control, a defrost control, a fan control, a water heating system, a water cooling system, or a solar panel controller.

17. The climate control and management system of claim 8 wherein said environmental control system is one of a heating system, a cooling system, a ventilation system, a humidity control system, a lighting system, a digital timer, a pressure control, a defrost control, a fan control, a water heating system, a water cooling system, or a solar panel controller.

18. The climate control and management system of claim 8 wherein said mobile interface is a mobile app.

19. The climate control and management system of claim 8 wherein at least one setting of said calendar settings indicates a day, a time of said day and a temperature.

20. The climate control and management system of claim 8 wherein at least one setting of said calendar settings is a humidity setting, a ventilation setting or a lighting setting.

* * * * *